United States Patent
Teraguchi et al.

(10) Patent No.: US 6,937,169 B2
(45) Date of Patent: Aug. 30, 2005

(54) DATA TRANSMITTING/RECEIVING METHOD AND DEVICE FOR ENCODER

(75) Inventors: Mikiya Teraguchi, Kawasaki (JP); Masayoshi Okamoto, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/829,538

(22) Filed: Apr. 22, 2004

(65) Prior Publication Data

US 2004/0212521 A1 Oct. 28, 2004

(30) Foreign Application Priority Data

Apr. 23, 2003 (JP) ........................................ 2003-118691
May 19, 2003 (JP) ........................................ 2003-139987

(51) Int. Cl.$^7$ ............................ H03M 7/00; H04B 14/04
(52) U.S. Cl. ............................ 341/50; 341/107; 341/60; 375/22; 375/23; 375/25
(58) Field of Search ................. 341/50–107; 375/22–25

(56) References Cited

U.S. PATENT DOCUMENTS

| | | | |
|---|---|---|---|
| 4,866,737 A | * 9/1989 | Seifried | ........................ 375/219 |
| 5,053,769 A | 10/1991 | Landmann | |
| 5,257,288 A | 10/1993 | Moser | |
| 5,684,768 A | * 11/1997 | Terasaki et al. | ......... 369/47.21 |
| 5,748,923 A | 5/1998 | Eitrich | |
| 5,751,232 A | * 5/1998 | Inoue et al. | ................... 341/59 |

FOREIGN PATENT DOCUMENTS

| | | |
|---|---|---|
| DE | 40 14 931 A1 | 11/1991 |
| DE | 44 08 488 A1 | 9/1995 |
| EP | 0 442 209 A1 | 8/1991 |
| JP | 08-247788 | 9/1996 |
| JP | 09-005114 | 1/1997 |
| JP | 10-160516 | 6/1998 |

* cited by examiner

*Primary Examiner*—Lam T Mai
(74) *Attorney, Agent, or Firm*—Rankin, Hill, Porter & Clark LLP

(57) ABSTRACT

When data detected by an encoder is transmitted/received in predetermined cycles in a measuring device using a sampling control system for controlling a position or a speed at predetermined time intervals, positional data is divided so as to be output with deviation data output each time. The divided positional is reconstituted so as to transmit the positional data within a control cycle.

22 Claims, 9 Drawing Sheets

Example: Deviation data (8-bit binaries)

| b7 | b6 | b5 | b4 | b3 | b2 | b1 | b0 |

Example: Positional data (48-bit binaries)

| b47 | b46 | b45 | b44 | b43 | b42 | b41 | b40 | • • • • • | b7 | b6 | b5 | b4 | b3 | b2 | b1 | b0 |

Positional data: 48 bit
Deviation data: 18 bit

Pn : (n+12*m)th bit of positon
In : nth bit of deviation
xx : Preliminary
ST : First flag of division of position
  (1 ... first, 0 ... subsequent)

DATA TRANSMITTING/RECEIVING METHOD AND DEVICE FOR ENCODER

CROSS-REFERENCE TO RELATED APPLICATION

The disclosure of Japanese Patent Applications No. 2003-118691 filed Apr. 23, 2003 and No. 2003-139987 filed May 19, 2003 including specifications, drawings and claims is incorporated herein by references in their entireties.

BACKGROUND OF THE INVENTION

1. Field of the Invention

The present invention relates to a data transmitting/receiving method and a device for an encoder, for transmitting and receiving data detected by an encoder in predetermined cycles. In particular, the present invention relates to a data transmitting/receiving method and a device for an encoder, which are capable of transmitting positional data within a control cycle in a measuring device using a sampling control system for controlling a position or a speed at predetermined time intervals. The present invention is suitable for use in an linear encoder or a rotary encoder (hereinafter, referred to collectively as an encoder) of a control device such as a three-dimensional coordinate measuring machine, a machine tool, an image measuring device, and a shape measuring device.

2. Description of the Related Art

Conventionally, in a control device such as a three-dimensional coordinate measuring machine, a machine tool, an image measuring device, and a shape measuring device, a so-called incremental pulse system is mainly used as a signal output form of an encoder for detecting a position or a speed. According to this system, as shown in FIG. 1, at each positional change, an incremental pulse is output as a counter pulse from an encoder 10 to a transmission line 30. A count value is updated by an UP/DOWN (UP/DN) counter 22 of a control device 20 each time the counter pulse is output. A frequency of the incremental pulse is limited to about 4 MHz (an edge interval is ⅛ MHz) in practical use because of the constraint on the transmission line 30 for transmitting the incremental pulse.

In the incremental pulse system, the relation between the maximum driving speed of the control device 20 and the counting resolution of the encoder 10 is expressed by the following formula (1). If the counting resolution of the encoder 10 is increased, the maximum driving speed of the control device 20 is disadvantageously restrained.

$$8 \text{ [MHz]} \leqq \text{maximum driving speed/counting resolution} \quad (1)$$

As described above, the incremental pulse system suffers from the constraint on the driving speed/counting resolution.

Therefore, in recent encoders for a digital control device, a serial data transmission system is more and more widely used (see Japanese Patent Laid-Open Publication Nos. Hei 9-5114, Hei 8-247788, and Hei 10-160516). According to this method, as shown in FIG. 2, an UP/DN counter 12, a data latch circuit 14, and a data conversion circuit 16 for converting a parallel signal into a serial signal are provided in the encoder 10. Positional data required for control by the control device 20 is transmitted from the encoder 10 in a serial sequence at each of the predetermined time intervals (control cycles) so that a serial data receiving circuit 24 of the control device 20 receives the data at each of the predetermined time intervals.

In the case of the former incremental pulse transmission system, only one incorrect transmission of a pulse due to an error, a noise or the like in the encoder 10 makes a subsequent measured position contain an error. In order to prevent such an error, the latter serial data transmission system is used to transmit the positional data itself. With the serial data transmission system, since positional or speed data required for each control cycle is received in serial communication, the data transmission line is not restrained any more. Therefore, the position can be detected with the maximum capacity of the encoder, so that high-speed driving and high resolution can be realized.

On the other hand, the maximum value of an incremental position corresponding to a deviation is determined by a product of the allowable maximum speed of the encoder and the maximum sampling time interval. Normally, in the case of the transmission of positional information, as shown in FIG. 3, a bit length to be transmitted is shorter in the case where, for example, deviation data requiring only 8-bit binaries is transmitted than in the case where, for example, positional data requiring 48 bit binaries is transmitted. Conversely, the transmission of positional data has a problem in that transfer time is disadvantageously increased than in the transmission of deviation data.

It is also conceivable to transmit deviation data in the serial transmission system. In this case, however, a similar problem to that inherent to the incremental pulse transmission system arises; that is, only one incorrect transmission of a pulse makes a subsequent measured position contain an error.

Moreover, in the case of the transmission of deviation data, unless positional data is transmitted at least once, the receiving side cannot calculate the position measured by the encoder from the deviation data. Therefore, in the case of cyclic transmission of deviation data, it is necessary to transmit the positional data between the transmissions of deviation data. Therefore, time cannot be spared long enough to transmit the positional data. As a result, there is a problem that the transmission of deviation data should be interrupted to transmit positional data or a time interval between the transmissions of deviation data should be set sufficiently long.

On the other hand, the encoder is used not only to control a moving object by the control device 20 but also to detect the position at the generation of a trigger signal. In such a case, in a measuring device (for example, a three-dimensional coordinate measuring machine) equipped with a control device including the former incremental pulse transmission system encoder, a digital signal processing circuit (DSP) (for example, CPU) 26 at the upper level in a sampling control system includes latch circuits 28 and 29 respectively for a control cycle of a position or a speed and for a trigger signal from an external sensor (for example, a touch sensor) 40 so as to latch and fetch data from the UP/DN counter 22 in accordance with the processing. More specifically, data for control is regularly latched in the latch circuit 28, whereas data for measurement is latched in the latch circuit 29 by a trigger signal generated from the external sensor 40.

As described above, however, the constraint on driving speed/counting resolution, which is inherent to the incremental pulse transmission system, is brought about.

On the other hand, in the latter serial data transmission system, there will arise no problem if the system is used for a device merely controlling a position or speed. However, this system has a problem in that the device cannot acquire any positional data at the generation of a trigger signal from the external sensor in addition to data for control at each predetermined cycle.

SUMMARY OF THE INVENTION

The present invention was devised in view of the above-described conventional problems and has a first object of enabling the transmission of positional data within a control cycle in a measuring device using a sampling control system for controlling a position or a speed at predetermined time intervals.

Moreover, the present invention has a second object of enabling efficient transmission of positional data at the generation of a trigger for measurement which is asynchronous with a control cycle, in a serial transmission system of positional/speed data without any constraint on driving speed or resolution.

The present invention achieves the first object by: dividing positional data at the transmission/reception of data detected by an encoder in predetermined cycles; and outputting the divided positional data with deviation data output each time while reconstituting the divided positional data.

Moreover, the present invention achieves the first object by: dividing positional data at the transmission of data detected by an encoder in predetermined cycles; and outputting the divided positional data with deviation data output each time.

Furthermore, the present invention achieves the first object by reconstituting the divided positional data at the reception of data transmitted from the encoder by the above-mentioned method.

Furthermore, data reliability may be improved by collating the reconstituted positional data with a position calculated from the deviation data.

Furthermore, the present invention achieves the first object by a data transmitting/receiving device for an encoder, for transmitting/receiving data detected by the encoder in predetermined cycles, which includes: means for dividing positional data; means for outputting the divided positional data with deviation data output each time; and means for reconstituting the divided positional data.

Moreover, the present invention achieves the first object by a data transmitting device for an encoder, for transmitting data detected by the encoder in predetermined cycles, which includes means for dividing positional data; and means for outputting the divided positional data with deviation data output each time.

Furthermore, the present invention achieves the first object by a data receiving device for an encoder, for receiving data transmitted from the data transmission device, which includes means for reconstituting the divided positional data.

Furthermore, the data receiving device may include means for collating the positional data with a position calculated from the deviation data to improve data reliability further.

According to the present invention, the positional data can be transmitted within a control cycle in a measuring device using a sampling control system for controlling a position or a speed at predetermined time intervals. Therefore, the measuring device driven at high speed with high resolution can be realized.

The present invention achieves the second object by: when data detected by an encoder is regularly transmitted/received whereas the data is irregularly transmitted/received at the generation of a trigger signal, outputting a trigger generation status, positional data at each predetermined time interval, and trigger generation data corresponding to deviation data from the positional data as the regularly transmitted/received data; and synthesizing the positional data at the generation of a trigger using the positional data and the deviation data.

In the case where data detected by an encoder is regularly transmitted whereas the data is irregularly transmitted at the generation of a trigger signal, a trigger generation status, positional data at each predetermined time interval, and trigger generation data corresponding to deviation data from the positional data are used as the regularly transmitted data.

When the data transmitted from the encoder in the above-mentioned data transmission method is received, the positional data at the generation of the trigger is synthesized by using the positional data and the deviation data, thereby achieving the second object.

A data transmitting/receiving device for an encoder, for regularly transmitting/receiving the data detected by the encoder while irregularly transmitting/receiving the data at the generation of a trigger signal, includes: means for outputting a trigger generation status, positional data at each predetermined time interval, and trigger generation data corresponding to deviation data from the positional data as the regularly transmitted/received data; and means for synthesizing the positional data at the generation of the trigger using the positional data and the deviation data, thereby achieving the second object.

A data transmitting device for regularly transmitting data detected by an encoder while irregularly transmitting data at the generation of a trigger signal, includes means for outputting a trigger generation status, positional data at each predetermined time interval, and trigger generation data corresponding to deviation data from the positional data as the regularly transmitted data.

A data receiving device for regularly receiving data transmitted from the encoder by the data transmission device, includes means for synthesizing the positional data at the generation of a trigger using the positional data and the deviation data.

In the case where data detected by an encoder is regularly transmitted/received while data is irregularly transmitted/received at the generation of a trigger signal, positional data at the generation of the trigger signal may be transmitted/received independently of the regularly transmitted/received data.

A data transmitting/receiving device for an encoder, for regularly transmitting/receiving data detected by the encoder while irregularly transmitting/receiving data at the generation of a trigger signal, may include means for transmitting/receiving the regularly transmitted/received data; and means for transmitting/receiving positional data at the generation of a trigger signal independently of the means.

With the above-described method, a measuring method characterized by transmission/reception of data detected by the encoder is provided.

Moreover, a measuring device characterized by including the data transmitting/receiving device is provided.

According to the present invention, an encoder driven at high speed with high resolution can be used without being restrained by a transmission line of an incremental pulse. As a result, the control stability of the measuring device is improved. Moreover, the measuring device driven at high speed with high resolution can be realized.

BRIEF DESCRIPTION OF THE DRAWINGS

The above object, features and advantages of the present invention, as well as other objects and advantages thereof, will become more apparent from the description of the invention which follows, taken in conjunction with the accompanying drawings, wherein like reference characters designate the same or similar parts and wherein.

BEST MODE OF THE INVENTION

Hereinafter, embodiments of the present invention will be described in detail with reference to the accompanying drawings.

Figure 1:
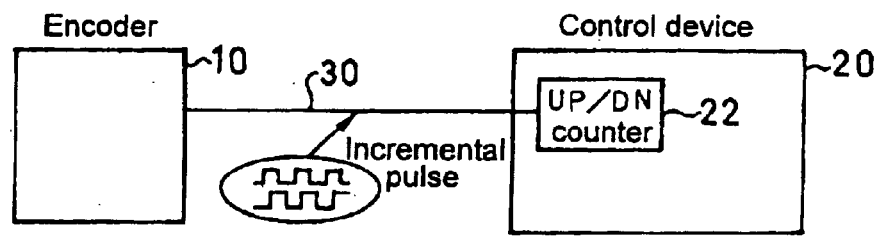
FIG. 1 is a block diagram showing an example of transmission of positional data by a conventional incremental pulse transmission system.
Figure 2:
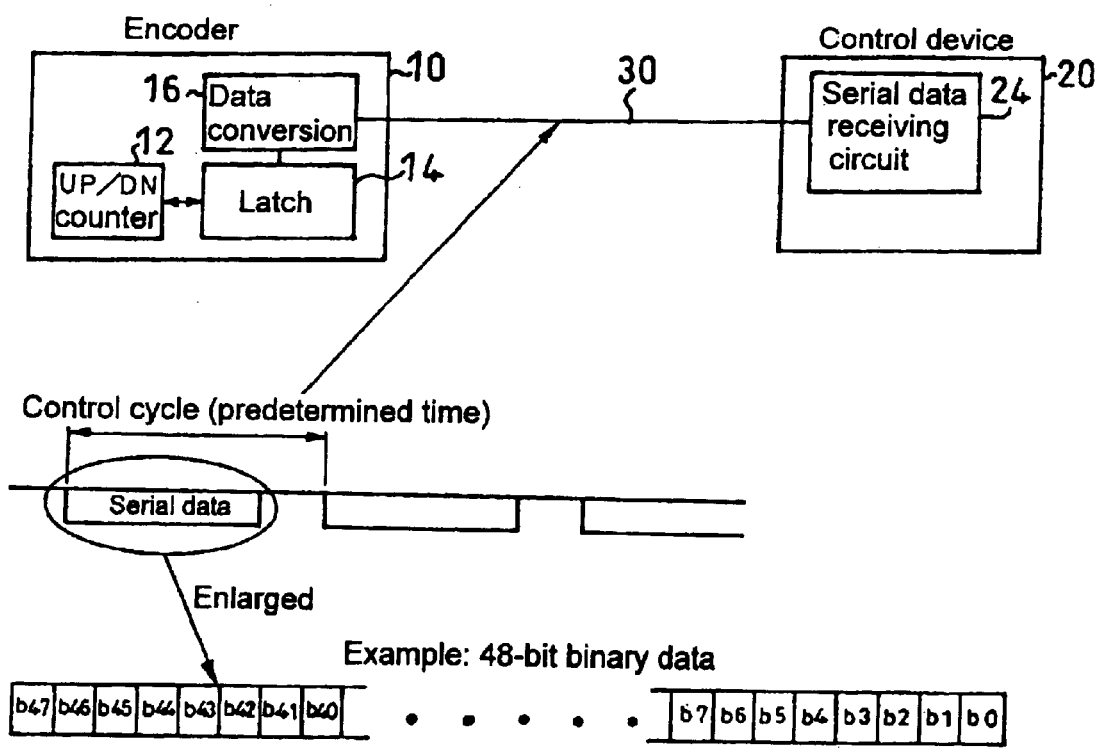
FIG. 2 is a block diagram showing an example of transmission of positional data by a conventional serial data transmission system.
Figures 3, 4:
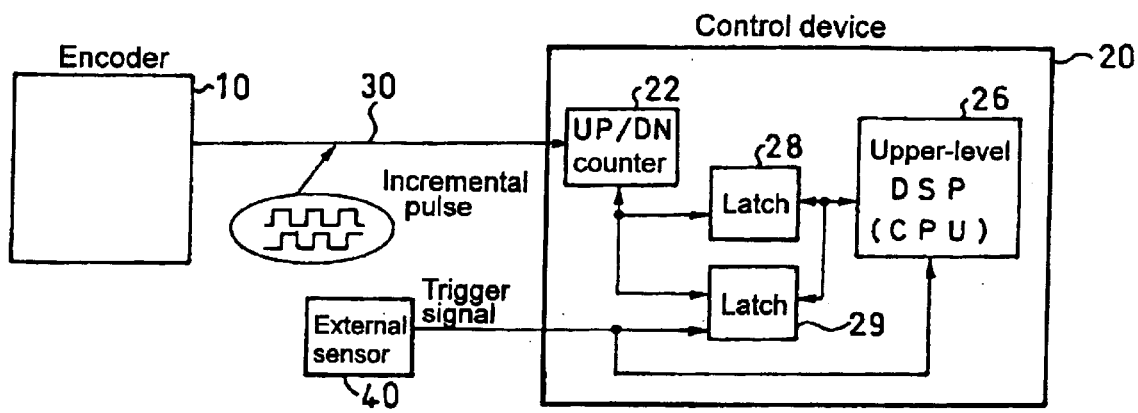
FIG. 3 is a diagram for comparison in length between deviation data and positional data as an example.
FIG. 4 is a block diagram showing an example of trigger signal processing of a measuring device according to the conventional incremental pulse transmission system.
Figure 5:
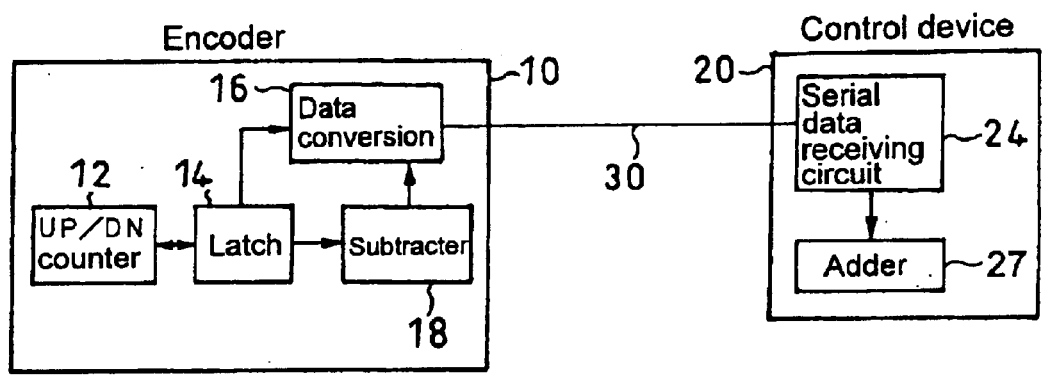
FIG. 5 is a block line diagram showing a structure of a first embodiment of the present invention.
Figure 6:
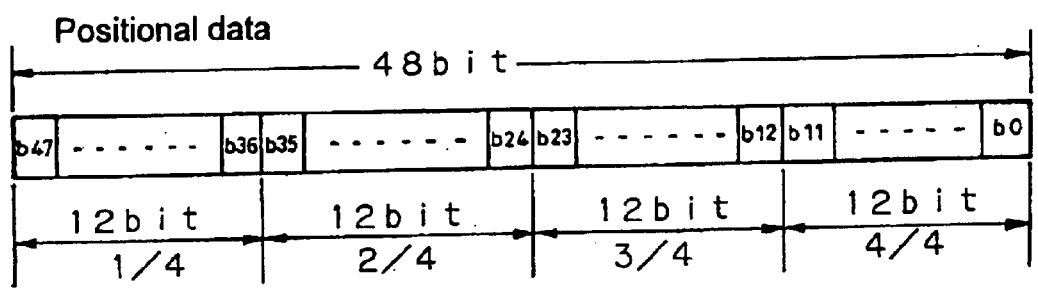
FIG. 6 is a diagram showing a method of dividing positional data in the first embodiment.
Figure 7:
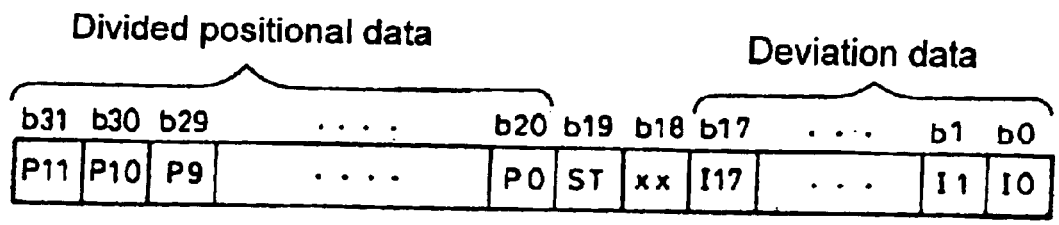
FIG. 7 is a diagram showing an example of an output format in the first embodiment.

In a first embodiment of the present invention, in the encoder 10 and the control device 20 in the serial data transmission system similar to those in the conventional example shown in FIG. 2, a subtracter circuit 18 for dividing positional data is provided in the encoder 10 as shown in FIG. 5. By the subtracter circuit 18, the positional data is time-divided as shown in FIG. 6 (in this case, into four). Each time-divided positional data is output with deviation data output each time as shown in FIG. 7. In addition, an adder circuit 27 for positional data reconstitution (synthesis) is provided in the control device 20 to reconstitute the positional data received by a serial data receiving circuit 24 so as to collate the reconstituted positional data with a position calculated from the deviation data.

More specifically, when the control device 20 issues a transfer request at each predetermined time interval corresponding to a control cycle, the encoder 10 transmits, to the transmission line 30, the time-divided positional data and deviation data from a position at the previous sampling as shown in FIG. 7 with its output data.

As a result, the control device 20 can acquire the deviation data for the number of times corresponding to the number of divided positional data. The number of division may be optimally set depending on the frequency of checking a position or a transmission speed required by the system, and is not therefore limited to four.

Figure 8:
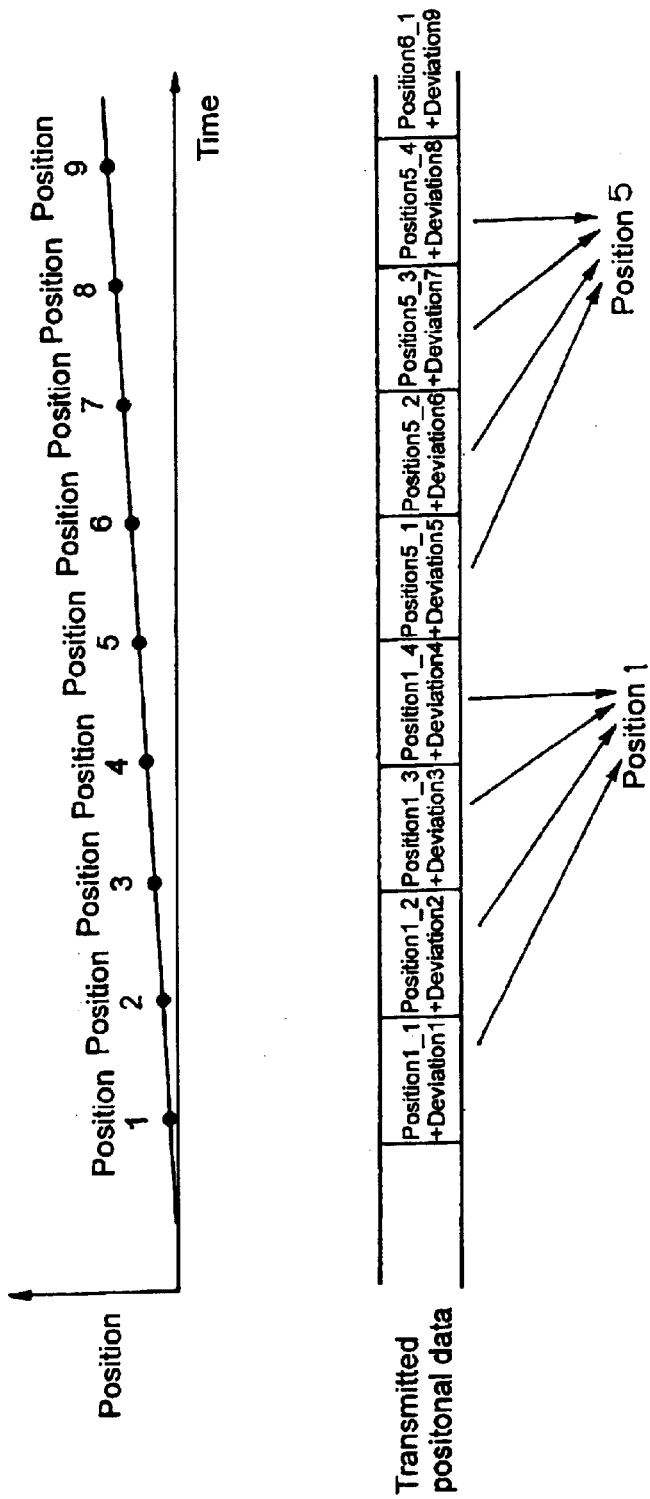
FIG. 8 is a diagram showing an example of the relation between a detected position, transmitted positional data, and reconstituted positional data in the first embodiment.

The control device 20 reconstitutes the divided positional data and collates the reconstituted data with a position calculated from the deviation data to check them, as shown in FIG. 8.

In this example, the positional data is divided into four. The positions can be synthesized according to the following formulae.

$$\text{Position 1} = \text{position 1\_1} * 2^{36} + \text{position 1\_2} * 2^{24} + \text{position 1\_3} * 2^{12} + \text{position 1\_4} \quad (2)$$

$$\text{Position 5} = \text{position 5\_1} * 2^{36} + \text{position 5\_2} * 2^{24} + \text{position 5\_3} * 2^{12} + \text{position 5\_4} \quad (3)$$

where the position 1_1, the position 1_2, the position 1_3, and the position 1_4 are the respective data obtained by dividing the position 1 into four. Moreover, $2^{36}$, $2^{24}$, and $2^{12}$ mean that corresponding divided positional data is carried by 36 digits, 24 digits and 12 digits, respectively.

The positional data (integrated position) can be calculated from a deviation by the following formulae.

$$\text{Integrated Position 2} = \text{Position 1} + \text{Deviation 1} \quad (4)$$

$$\text{Integrated position 3} = \text{Integrated Position 2} + \text{Deviation 2} \quad (5)$$

$$\text{Integrated position 4} = \text{Integrated Position 3} + \text{Deviation 3} \quad (6)$$

$$\text{Integrated position 5} = \text{Integrated Position 4} + \text{Deviation 4} \quad (7)$$

The collation is carried out to check if the integrated position 5 calculated by the Formula (7) and the position 5 reconstituted by the formula (3) are identical with each other.

In order to calculate the positional data from the deviation, the positional data serving as a reference is needed. In order to acquire the positional data, 48 bits data may be previously transferred only once in a different transmission format or data may be transferred for four times in the same transmission format so as to synthesize the positional data. The use of the positional data makes it possible to check if the positional data calculated from the deviation is correct. The collation may be omitted depending on the use.

Figure 9:
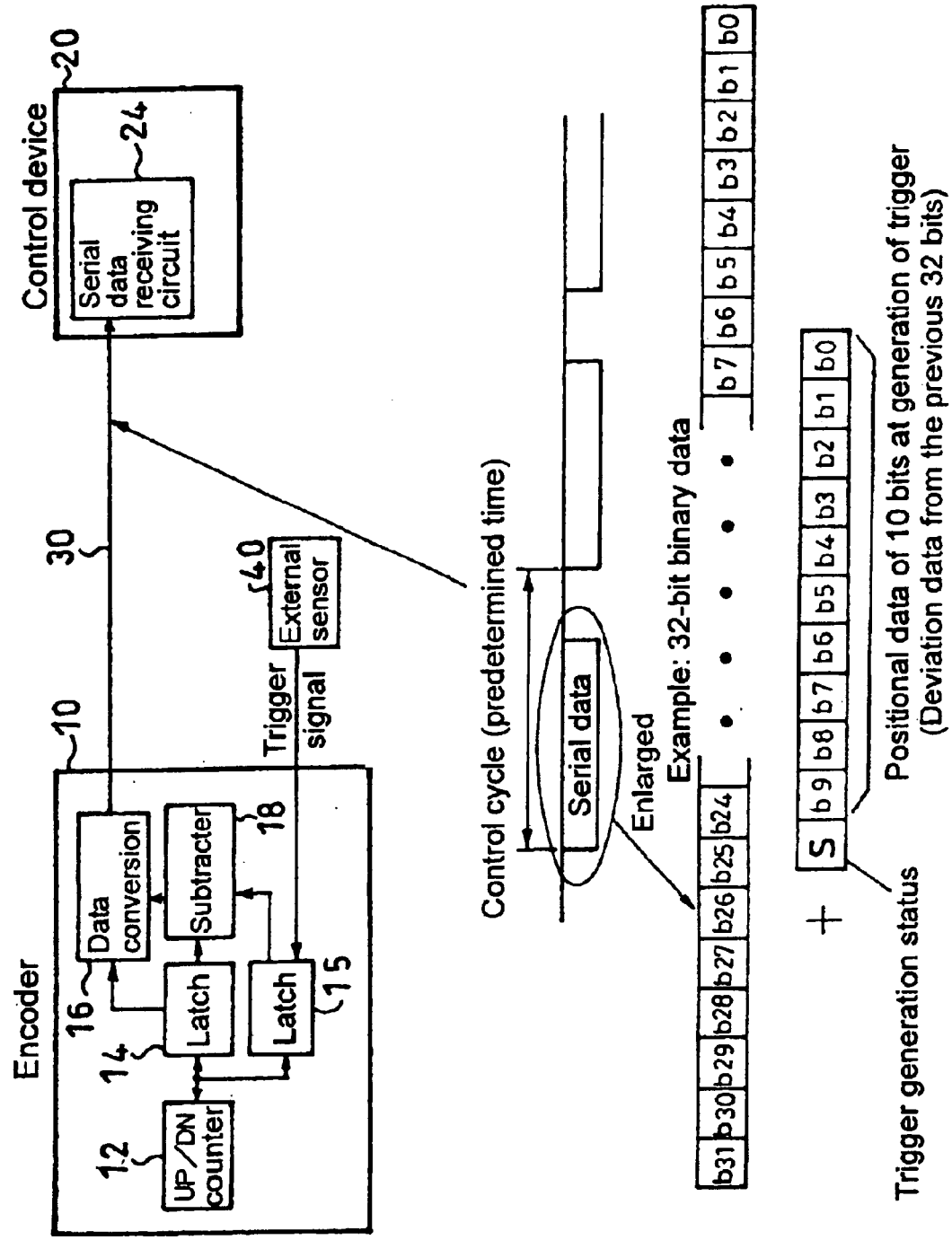
FIG. 9 is a block diagram showing a structure of a second embodiment and a format of transmitted data in the second embodiment of the present invention.

A second embodiment of the present invention will now be described. In this second embodiment, in the encoder 10 and the control device 20 in the serial data transmission system similar to those in the conventional example shown in FIG. 2, a latch circuit 14 for control data, a latch circuit 15 for measurement data, and the subtracter circuit 18 are provided in the encoder 10 as shown in FIG. 9. The latch circuit 14 for control data stores data for control in a cyclic manner. The latch circuit 15 for measurement data stores an output from the UP/DN counter 12 when a trigger signal is input from the external sensor 40. The subtracter circuit 18 obtains a difference between the previous positional data for control, which is stored in the latch circuit 14 for control data, and the positional data for measurement at the generation of the trigger signal. As data transmitted to the control device 20 at each predetermined time interval, a data conversion circuit 16 transmits a trigger generation status S (for example, 1 bit) of the external sensor 40, positional data for control (for example, 32 bits) at each predetermined time interval, and positional data for measurement (for example, 10 bits) at the generation of a trigger, corresponding to deviation data from the positional data.

More specifically, an external trigger signal input from the external sensor 40 is fetched into the encoder 10. As output data from the encoder 10 in the serial transmission system, the trigger signal generation status S of the external sensor 40 is provided. Furthermore, the positional data for measurement at the generation of the trigger is also carried with the positional data for control at each predetermined time interval. Herein, the positional data for measurement at the generation of a trigger corresponds to the deviation data from the previous positional data for control at each predetermined time interval.

As a result, the control device 20 is able to determine the generation of a trigger signal based on the trigger generation status S. Therefore, without remarkably increasing the amount of data, the control device 20 can simultaneously receive the positional data for control at each predetermined time interval for controlling a position or a speed and the positional data for measurement (the deviation data from the previous positional data for control) at the generation of a trigger signal from the external sensor, which is generated asynchronous with the control.

Figure 10:
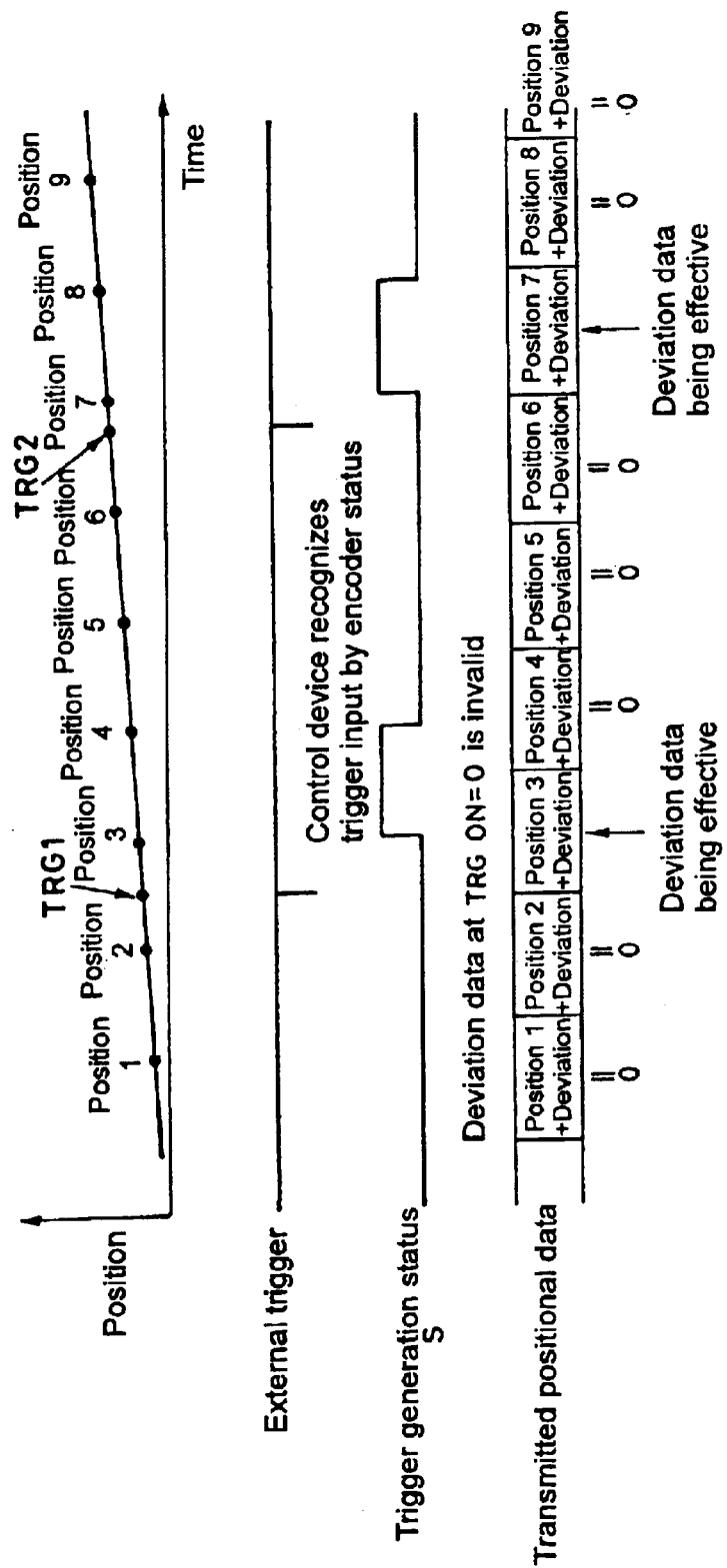
FIG. 10 is a time chart showing an example of the relation between the positional data for control and the positional data for measurement in the second embodiment.
Figure 11:
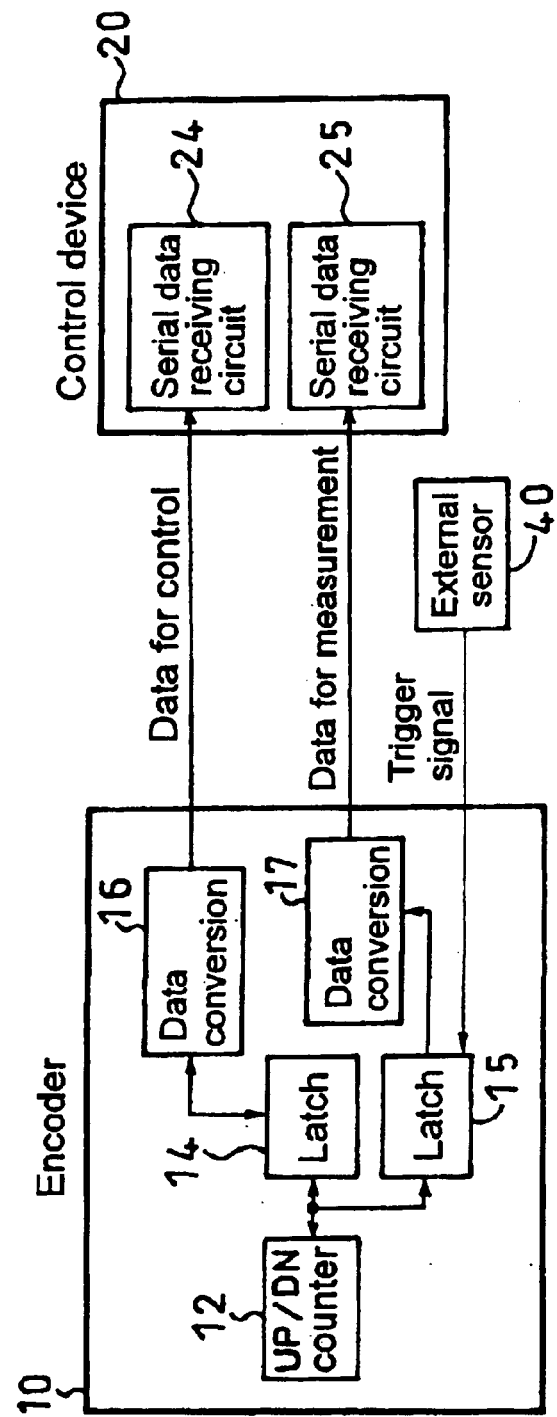
FIG. 11 is a block diagram showing a structure of a third embodiment of the present invention.

An example of the relation between the positional data for control at each predetermined time interval (positions 1, 2, . . . ) and the positional data for measurement at the generation of trigger signals (TRG1 and TRG2) is shown in FIG. 10. In this case, the deviation data is effective only when the trigger signal is turned ON (in FIG. 10, at the positions 3 and 7), whereas the deviation data is 0 at the other positions. It is sufficient for the deviation data at the generation of the trigger signal to represent the maximum positional data generated and moved within a single control cycle of the sampling control, an optimal bit number (in this case, 10 bits) may be set depending on the control cycle of the control device and the resolution of the encoder.

According to the second embodiment described above, through only one transmission line 30 of the data for control as in the conventional device, the data for measurement can also be transmitted.

Next, a third embodiment of the present invention where a transmission line 32 is provided independently of that of the data for control will be described in detail.

Figure 12:
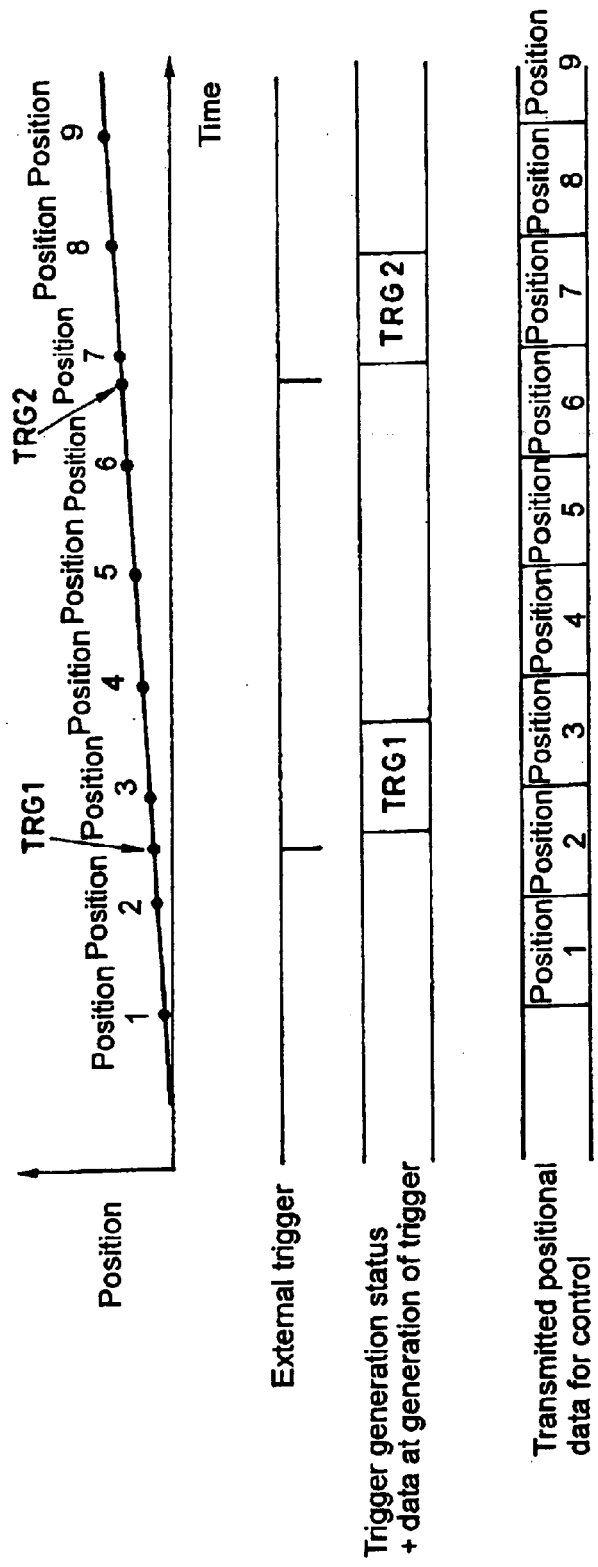
FIG. 12 is a time chart showing an example of the relation between the positional data for control and the positional data for measurement in the third embodiment.

In this embodiment, as shown in FIG. 12, a data conversion circuit 17 for directly converting an output from the latch circuit 15 for measurement data into a serial signal is provided in the encoder 10 similar to that in the second embodiment. The positional data for measurement, which is serialized by the data conversion circuit 17, is directly transmitted to a serial data receiving circuit 25 for measurement in the control device 20.

An example of the relation between the positional data for control (positions 1, 2. . . ) at each predetermined time interval and the positional data for measurement (TRG1 and TRG2) at the generation of triggers in this embodiment is shown in FIG. 12.

Since the data for control and the data for measurement are independent of each other in this embodiment, the data for measurement can be transmitted without increasing the amount and the length of the data for control.

The present invention can be applied to any types of encoder such as a linear encoder and a rotary encoder. The number of bits of data is not limited to those in the embodiments described above.

Although certain preferred embodiments have been shown and described, it should be understood that many changes and modifications may be made therein without departing from the scope of the appended claims.

What is claimed is:

1. A method for transmitting/receiving data of an encoder, the data detected by the encoder being transmitted/received in predetermined cycles, the method comprising the steps of:
   dividing positional data;
   outputting the divided positional data with deviation data output each time; and
   reconstituting the divided positional data.

2. The method for transmitting/receiving data of an encoder according to claim 1, wherein
   the reconstituted positional data is collated with a position calculated from the deviation data.

3. A method for transmitting data of an encoder, the data detected by the encoder being transmitted in predetermined cycles, the method comprising the steps of:
   dividing positional data; and
   outputting the divided positional data with deviation data output each time.

4. A method for receiving data of an encoder, divided positional data transmitted from the encoder being received with deviation data output each time, the method comprising the step of:
   reconstituting the divided positional data.

5. The method for receiving data of an encoder according to claim 4, wherein
   the reconstituted positional data is collated with a position calculated from the deviation data.

6. A data transmitting/receiving device for an encoder, for transmitting/receiving data detected by the encoder in predetermined cycles, the device comprising:
   means for dividing positional data;
   means for outputting the divided positional data with deviation data output each time; and
   means for reconstituting the divided positional data.

7. The data transmitting/receiving device for an encoder according to claim 6, comprising means for collating the reconstituted positional data with a position calculated from the deviation data.

8. A data transmitting device for an encoder, for transmitting data detected by the encoder in predetermined cycles, the device comprising:
   means for dividing positional data; and
   means for outputting the divided positional data with deviation data output each time.

9. A data receiving device for an encoder, for receiving divided positional data transmitted from a data transmitting device with deviation data output each time, the device comprising:
   means for reconstituting the divided positional data.

10. The data receiving device for an encoder according to claim 9, comprising means for collating the reconstituted positional data with a position calculated from the deviation data.

11. A method for transmitting/receiving data of an encoder, the data detected by the encoder being regularly transmitted/received whereas the data is irregularly transmitted/received at the generation of a trigger signal, the method comprising the steps of:
   outputting a trigger generation status, positional data at each predetermined time interval, and trigger generation data corresponding to deviation data from the positional data as the regularly transmitted/received data; and
   synthesizing the positional data at the generation of a trigger using the positional data and the deviation data.

12. A method for transmitting data of an encoder, the data detected by the encoder being regularly transmitted whereas the data is irregularly transmitted at the generation of a trigger signal, the method comprising the step of:

outputting a trigger generation status, positional data at each predetermined time interval, and trigger generation data corresponding to deviation data from the positional data as the regularly transmitted data.

13. A method for receiving data of an encoder, in which a trigger generation status, positional data at each predetermined time interval, and trigger generation data corresponding to deviation data from the positional data regularly transmitted from the encoder are received, the method comprising the step of:

synthesizing the positional data at the generation of a trigger using the positional data and the deviation data.

14. A data transmitting/receiving device for an encoder, for regularly transmitting/receiving the data detected by the encoder while irregularly transmitting/receiving the data at the generation of a trigger signal, the device comprising:

means for outputting a trigger generation status, positional data at each predetermined time interval, and trigger generation data corresponding to deviation data from the positional data as the regularly transmitted/received data; and means for synthesizing the positional data at the generation of a trigger using the positional data and the deviation data.

15. A data transmitting device for an encoder, for regularly transmitting data detected by the encoder while irregularly transmitting the data at the generation of a trigger signal, the device comprising means for outputting a trigger generation status, positional data at each predetermined time interval, and trigger generation data corresponding to deviation data from the positional data as the regularly transmitted data.

16. A data receiving device for an encoder, for regularly receiving a trigger generation status, positional data at each predetermined time interval, and trigger generation data corresponding to deviation data from the positional data regularly transmitted from a data transmitting device, the receiving device comprising means for synthesizing the positional data at the generation of a trigger using the positional data and the deviation data.

17. A method for transmitting/receiving data of an encoder, the data detected by the encoder being regularly transmitted/received while the data is irregularly transmitted/received at the generation of a trigger signal, the method comprising the step of transmitting/receiving positional data at the generation of the trigger signal independently of the regularly transmitted/received data.

18. A data transmitting/receiving device for an encoder, for regularly transmitting/receiving data detected by the encoder while irregularly transmitting/receiving the data at the generation of a trigger signal, the device comprising:

means for transmitting/receiving the regularly transmitted/received data; and means for transmitting/receiving positional data at the generation of the trigger signal independently of the means.

19. A measuring method comprising the step of transmitting/receiving data detected by an encoder by the method for transmitting/receiving data according to claim 11.

20. A measuring device comprising the data transmitting/receiving device according to claim 14.

21. A measuring method comprising the step of transmitting/receiving data detected by an encoder by the method for transmitting/receiving data according to claim 17.

22. A measuring device comprising the data transmitting/receiving device according to claim 18.

* * * * *

UNITED STATES PATENT AND TRADEMARK OFFICE
CERTIFICATE OF CORRECTION

PATENT NO. : 6,937,169 B2
DATED : August 30, 2005
INVENTOR(S) : Teraguchi et al.

It is certified that error appears in the above-identified patent and that said Letters Patent is hereby corrected as shown below:

Title page,
Item [57], ABSTRACT,
Line 6, after "positional", insert -- data --.

Signed and Sealed this

First Day of November, 2005

JON W. DUDAS
*Director of the United States Patent and Trademark Office*